US005138526A

United States Patent [19]

Chung Hsiang

[11] Patent Number: 5,138,526

[45] Date of Patent: Aug. 11, 1992

[54] INTERFACE SLOT AND SPEAKER SEAT STRUCTURE FOR A MOTHER BOARD

[76] Inventor: Lin Chung Hsiang, 5F,23, 70, Fu-Shing Road, Taoyuan, Taiwan

[21] Appl. No.: 755,851

[22] Filed: Sep. 6, 1991

[51] Int. Cl.[5] .................. H05K 7/00

[52] U.S. Cl. .................. 361/392; 361/395; 361/399; 361/415

[58] Field of Search .................. 361/392, 393, 394, 395, 361/399, 380, 400, 415; 181/141; 381/205

[56] References Cited

U.S. PATENT DOCUMENTS

| | | | |
|---|---|---|---|
| 4,277,653 | 7/1981 | Pawelzick | 179/146 E |
| 4,337,380 | 6/1982 | Tezuka et al. | 179/146 E |
| 4,546,850 | 10/1985 | Litner | 181/141 |
| 4,923,032 | 5/1990 | Nuernberger | 181/150 |

*Primary Examiner*—Leo P. Picard
*Assistant Examiner*—Young S. Whang
*Attorney, Agent, or Firm*—Bacon & Thomas

[57] ABSTRACT

An interface slot and speaker seat structure for a mother board wherein the structure includes a fixing frame provided with a plurality of spaced left and right trapezoid blocks, with adjacent blocks being provided with corresponding elastic retainers and defining a slot therebetween having elastic elements for securely holding an interface. The fixing frame also includes a speaker seat for holding a speaker, and both positioning hooks and tabs are provided for engaging corresponding slots and holes formed in a computer frame for attaching the fixing frame to the computer frame without requiring fasteners.

4 Claims, 2 Drawing Sheets

1
13
14
12
8
4

1
51
5
52
2
311
3
31
2
211
21
22
221
32
321
4
2
11

7
6
72
71

INTERFACE SLOT AND SPEAKER SEAT STRUCTURE FOR A MOTHER BOARD

BACKGROUND OF THE INVENTION

The present invention relates to an interface slot and speaker seat structure for a mother board, particularly a simple and useful structure to hold the interface and speaker in place.

Conventionally, an interface is fixed to a computer frame by means of bolt or brace, and the speaker is fixed by means of bolts. With emphasis on compactness, a computer frame today is designed with the smallest space for all necessary accessories. Conventionally, an interface is fixed with a bolt or a partitioning post. If it is installed horizontally, considerable space is required, thus rendering it difficult to install and remove. It requires extra fasteners for positioning, which means extra material cost is required. Furthermore, such a design requires a complicated production and assembly procedure and it does not meet the requirements of design for contemporary electronic products, including compact size and low production cost. In view of the above disadvantages, the present invention provides an interface slot and speaker seat structure for a mother board which has the following features:

(1) Simple and small fixing frame structure made by injection molding process to facilitate manufacturing and minimize cost of production;

(2) Left and right trapezoid blocks with slots are provided to hold the interface and elastic retainers are provided to secure same firmly; and a circular seat is provided to hold a speaker without use of other parts, so therefore, assembly is easy, cost of production is low, and time of assembly can be saved;

(3) Use of positioning hooks and tabs for securely attaching the fixing frame to a computer frame directly;

(4) Small fixing frame structure for installation of several interfaces and a speaker, and its use will not be limited by length or size of the mother board;

(5) It is easy to install and remove the fixing frame as well as to install and remove the interface from the slot between the left and right trapezoid blocks; and it is suitable for any kind of mother board; and (6) Use of elastic retainers and elastic elements permit the positioning of an interface of standard thickness and length by compression.

SUMMARY OF THE INVENTION

The present invention provides an interface slot and speaker seat structure for a mother board, particularly a simple structure for fixing an interface and a speaker on the mother board. It comprises a fixing frame having a plurality of left trapezoid blocks and right trapezoid blocks thereon. A slot is formed between adjacent left and right trapezoid blocks for holding an interface. Each of the left and right trapezoid blocks has an elastic retainer to secure the interface and elastic elements are provided to be compressed by the interface so that the interface is securely positioned. The fixing frame has a speaker seat in the form of a circular seat for holding a speaker. Positioning hooks are provided at the sides of the fixing frames and positioning tabs are provided at the bottom of the fixing frames to engage with corresponding holes formed on the computer frame so that the fixing frame can be fixed to the computer frame without requiring fasteners.

Objects and features of the invention will become more apparent from the following detailed description taken in connection with the accompanying drawings.

DETAILED DESCRIPTION OF THE PREFERRED EMBODIMENTS

Figure 1:
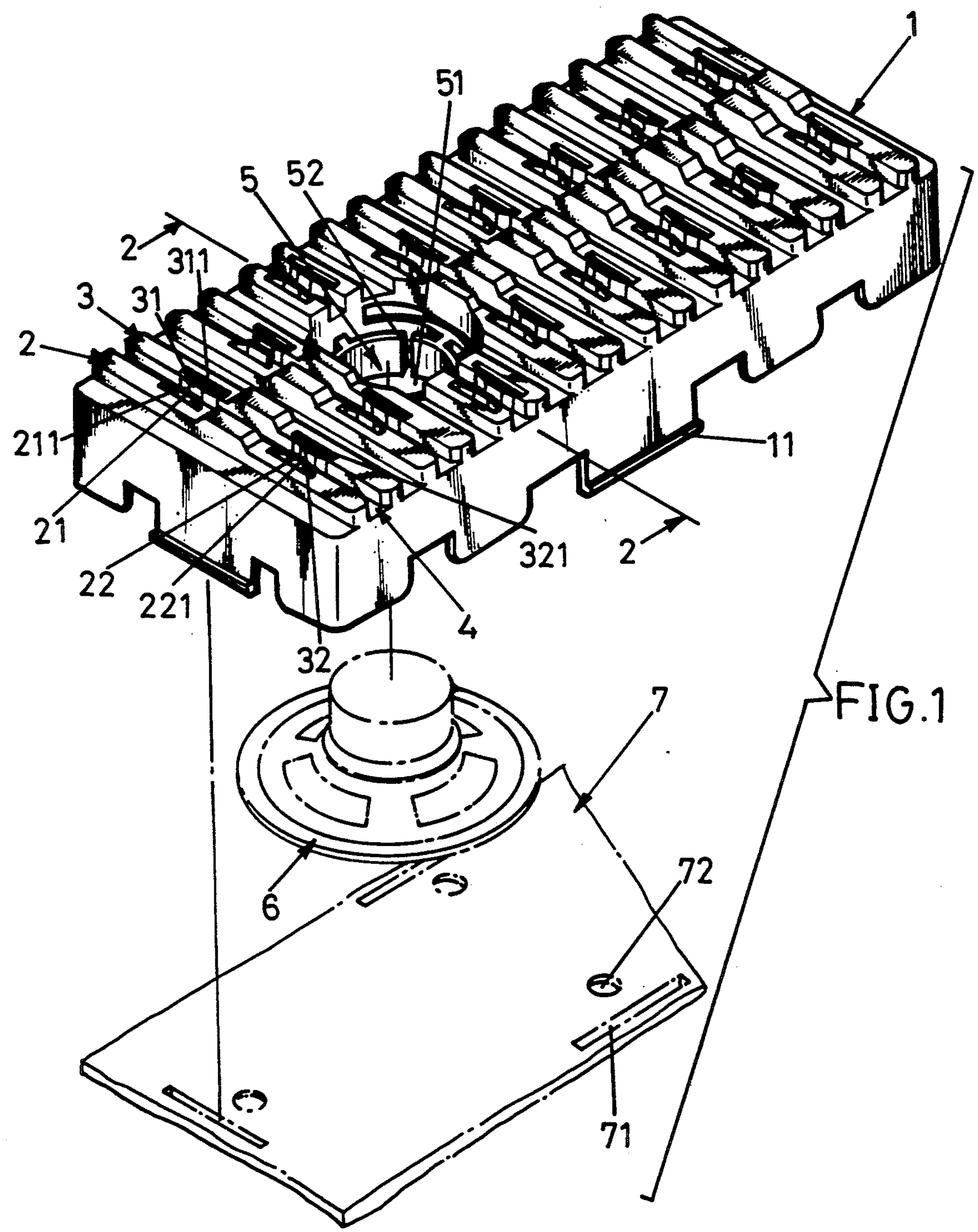
FIG. 1 is a perspective view of an interface slot and speaker seat structure for a mother board according to the present invention.
Figure 2:
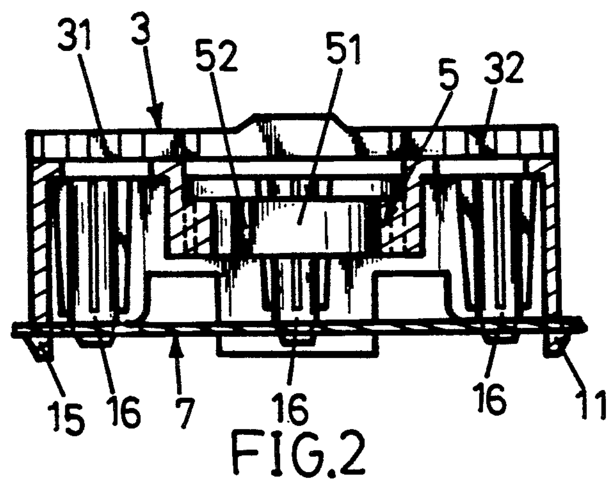
FIG. 2 is a cross-sectional view taken along the line 2—2 in FIG. 1.
Figure 3:
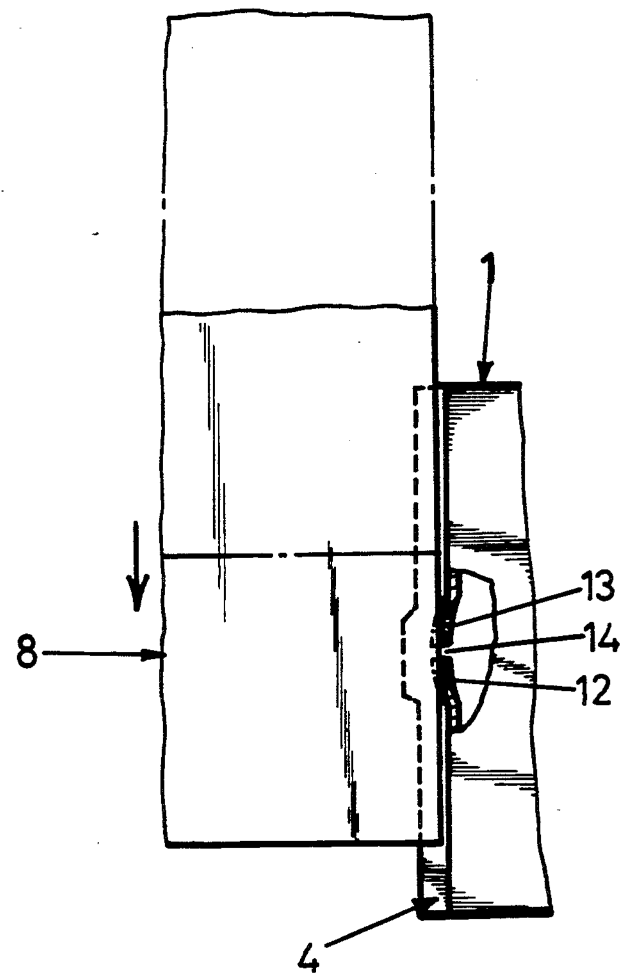
FIG. 3 illustrates the function of the elastic elements for positioning an interface on the fixing frame according to the present invention.

As shown in FIGS. 1 and 2, the present invention includes a fixing frame (1) with a plurality of left trapezoid blocks (2) and a plurality of right trapezoid blocks (3) equidistantly arranged and spaced on its surface. A slot (4) is defined between each left trapezoid block (2) and each right trapezoid block (3), and there is provided a plurality of retainers (21, 22, 31 and 32) corresponding to the slot (4) on each left trapezoid block (2) and each right trapezoid block (3), respectively. The retainers (21 and 22) are extended from the left trapezoid block (2) and bent towards the slot (4). The retainers (31 and 32) are extended from the right trapezoid block (3) and bent towards the slot (4). A seam (211, 221, 311 or 321) is formed between each retainer (21, 22, 31, or 32) and the trapezoid block (2 or 3) so that the retainers (21, 22, 31 and 32) are elastic to secure any interface having a thickness within an allowable limit placed between them. As shown in FIG. 3, an opening (14) is formed in the middle of each slot (4). Two symmetric curved elastic elements (12 and 13) are formed on opposite sides of the opening (14) for compression by an interface (8) of standard length to securely position same.

A speaker seat (5) is provided on the fixing frame (1) at an appropriate position. It is made in the form of a circular wall (51) with a notch (52) so that a speaker (6) can be fixed on the circular seat (51) and the notch (52) is expanded to secure the speaker (6) on the fixing frame (1) by elasticity of the circular wall (51).

Each lateral side of the fixing frame (1) has a positioning hook (11 or 15). There is a plurality of positioning tabs (16) extending from the bottom of the fixing frame (1). By engaging the positioning hooks (11 and 15) in their corresponding positioning slots (71) on a computer frame (7) and positioning the positioning tabs (16) in their corresponding positioning holes (72) on the computer frame (7), the fixing frame (1) can be firmly fixed on the computer frame (7).

I claim:

1. An interface slot and speaker seat structure for a mother board comprising:

a) a fixing frame provided with a plurality of left trapezoid blocks and a plurality of right trapezoid blocks, a slot defined between adjacent left and right trapezoid blocks;

b) each trapezoid block including a retainer corresponding to its slot for securing an interface within the slot;

c) each slot including means for positioning an interface therein;

d) means for securing a speaker in the fixing frame; and e) a positioning hook at each of two lateral sides of the fixing frame and a plurality of positioning tabs extending from the bottom of the fixing frame for engaging, respectively, positioning slots and positioning holes formed in a computer frame to secure the fixing frame to the computer frame.

2. The structure of claim 1 wherein the retainer of each trapezoid block extends inwardly into the slot and a spacing is provided between each retainer and its corresponding block for imparting elasticity to the retainer to secure an interface within the slot.

3. The structure of claim 1 wherein the means for positioning an interface within the slot includes an opening formed in the middle of the slot and two symmetrical elastic elements on opposite sides of the opening for compression by the interface.

4. The structure of claim 1 wherein the means for securing a speaker in the fixing frame includes a seat defined by a circular wall having a notch formed therein to impart elasticity to the wall for securing the speaker therein.

* * * * *